United States Patent [19]

Neiheisel

[11] Patent Number: 5,127,736
[45] Date of Patent: * Jul. 7, 1992

[54] APPARATUS FOR MEASURING WEAR IN THE LINING OF REFRACTORY FURNACES

[75] Inventor: Gary L. Neiheisel, Cincinnati, Ohio

[73] Assignee: Armco Inc., Middletown, Ohio

[*] Notice: The portion of the term of this patent subsequent to Nov. 24, 2004 has been disclaimed.

[21] Appl. No.: 33,079

[22] Filed: Mar. 31, 1987

Related U.S. Application Data

[63] Continuation of Ser. No. 560,915, Dec. 13, 1983, Pat. No. 4,708,482, which is a continuation-in-part of Ser. No. 351,316, Feb. 22, 1982, abandoned.

[51] Int. Cl.$^5$ .................. G01B 11/02; F27D 1/16
[52] U.S. Cl. ............................ 356/376; 356/381
[58] Field of Search ...................... 356/1, 376, 381

[56] References Cited

U.S. PATENT DOCUMENTS

| | | | |
|---|---|---|---|
| 2,982,856 | 5/1961 | Camp. | |
| 3,187,185 | 6/1965 | Milnes | 356/381 |
| 4,053,234 | 10/1977 | McFarlane | 356/381 |
| 4,093,991 | 6/1978 | Christie et al. | 356/326 |
| 4,107,244 | 8/1978 | Ochiai et al. | 264/30 |
| 4,113,384 | 9/1978 | Lauer et al. | 356/70 |
| 4,218,989 | 8/1980 | Fujita et al. | 118/713 |
| 4,227,802 | 10/1980 | Scholdstrom | 356/381 |
| 4,233,513 | 11/1980 | Elder et al. | 356/418 |
| 4,248,532 | 2/1981 | Nosler | 356/1 |
| 4,248,809 | 2/1981 | Sakai et al. | 264/30 |
| 4,301,998 | 11/1981 | Rodway | 266/281 |
| 4,331,975 | 5/1982 | Krawza et al. | 356/1 |
| 4,373,804 | 2/1983 | Pryor et al. | 356/1 |
| 4,373,805 | 2/1983 | Mallinson | 356/1 |
| 4,453,083 | 6/1984 | Bohländer et al. | 356/1 |
| 4,708,482 | 11/1987 | Neiheisel | 356/376 |

FOREIGN PATENT DOCUMENTS

| | | |
|---|---|---|
| 45251A1 | 11/1979 | Fed. Rep. of Germany. |
| 2343996 | 3/1976 | France. |
| 2020418 | 11/1979 | United Kingdom. |

OTHER PUBLICATIONS

"AGA IMS 1600 Measuring System–System Description", (no date).

Primary Examiner—Richard A. Rosenberger
Attorney, Agent, or Firm—Frost & Jacobs

[57] ABSTRACT

A continuous wave laser light beam is directed at the refractory lining within a furnace vessel, and the displacement as measured by a self-scanned linear array of the scattered light beam from a nominal or reference position measured to provide an indication of lining wear or damage. The video signal received by the linear array receiver provides information for mapping the worn or damaged areas of the vessel lining so that such areas may be repaired by a gunning spray nozzle. The inspection apparatus includes an optical filter which is temperature controlled to prevent wavelength shifts away from the nominal laser wavelength. The electronic processing circuitry includes a voltage controlled oscillator responsive to the average background level for modifying the scan rate of the linear array to compensate for changes in background level. The threshold against which the reflected laser beam video signal is compared is also a function of background level. Consequently, the system is self-compensating for changes in background radiation temperature. The apparatus may be lowered into a hot furnace vessel following each heat without the need to cool the furnace vessel. The inspection apparatus is mechanically scanned vertically and angularly within the vessel to provide a large number of inspection data points.

8 Claims, 4 Drawing Sheets

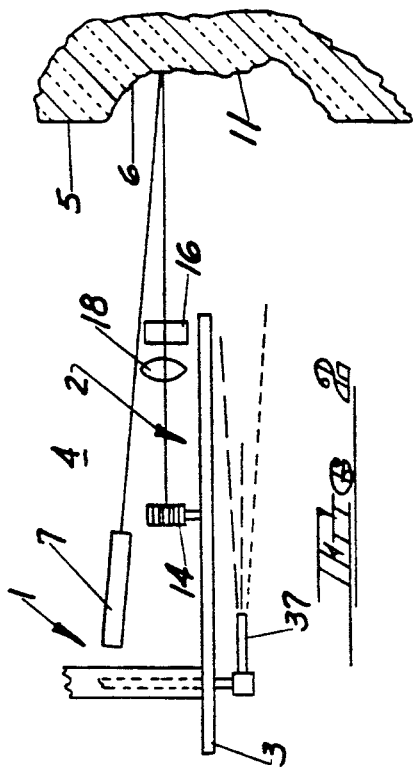
FIG. 2
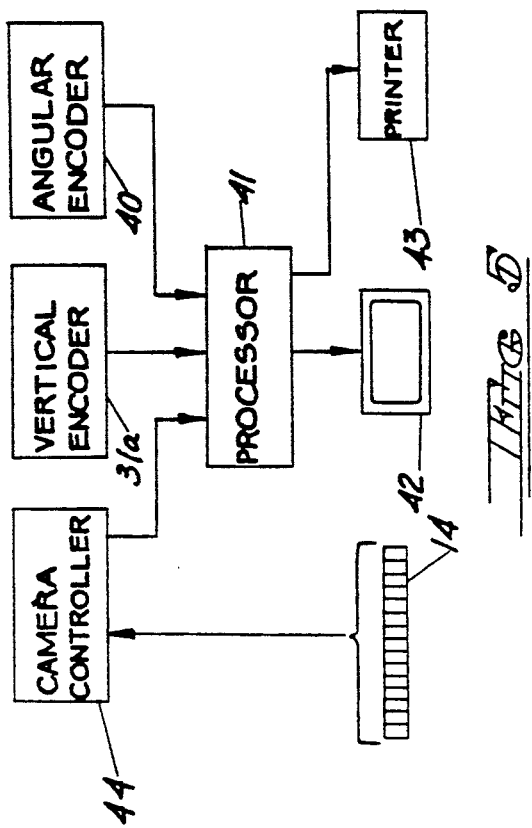
FIG. D
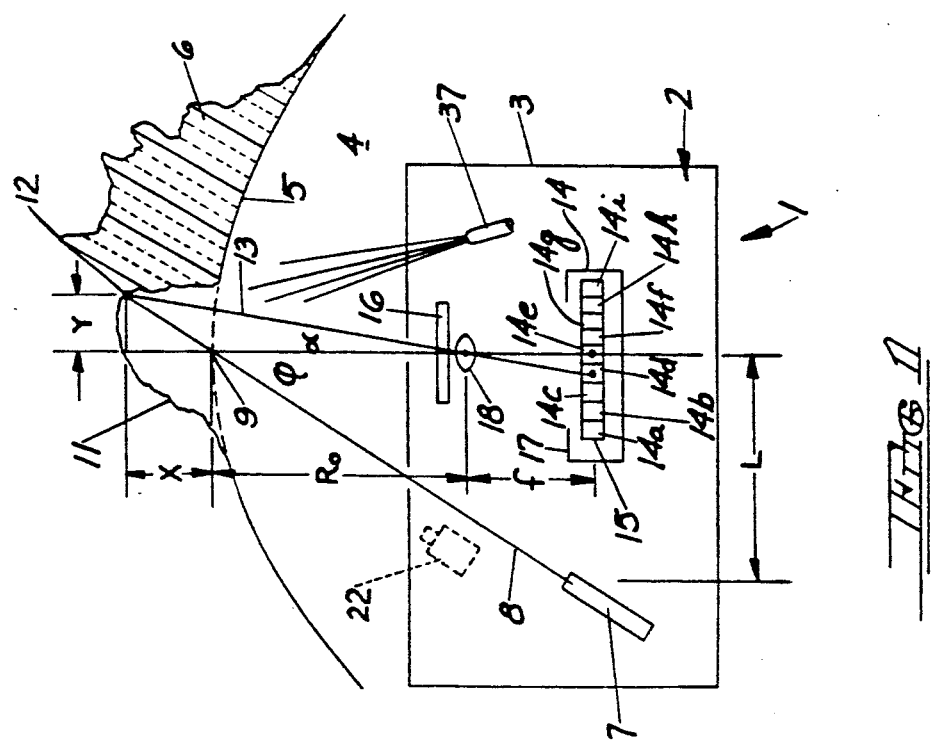
FIG. 1

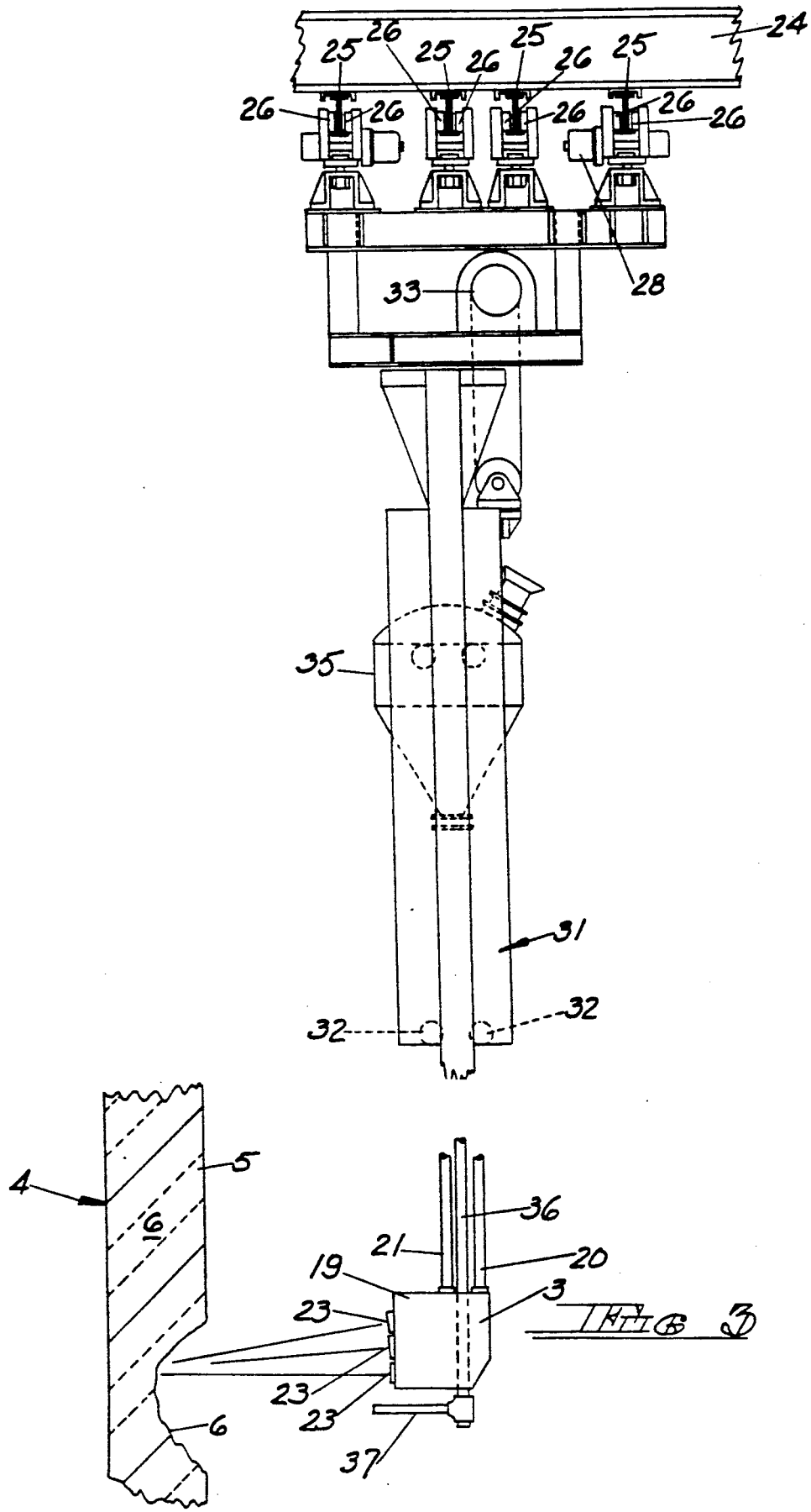

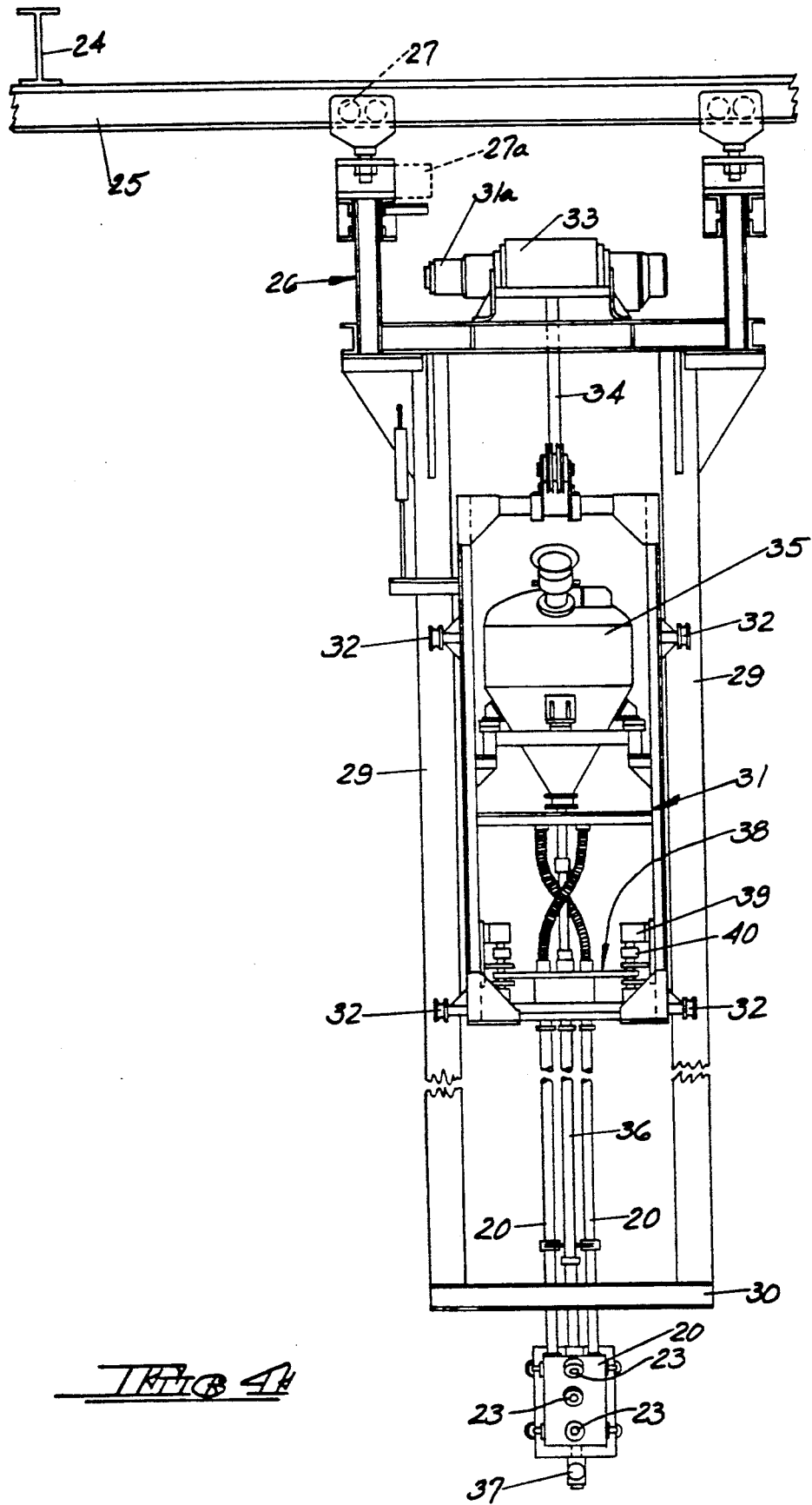

APPARATUS FOR MEASURING WEAR IN THE LINING OF REFRACTORY FURNACES

This is a continuation of application Ser. No. 560,915, filed Dec. 13, 1983 (and issued Nov. 24, 1987 as U.S. Pat. No. 4,708,482), which was a continuation-in-part of Ser. No. 351,316, filed Feb. 22, 1982, now abandoned.

SUMMARY OF THE INVENTION

The present invention is directed to measurement of wear occurring in steel furnace refractory linings, and more particularly to measurement using a laser transmitter and linear scanned array receiver having a temperature stabilized narrow band filter and electronic background compensation control means.

The interior wall of BOF steel furnaces is often provided with a refractory lining to prevent the molten steel contents of the vessel from coming in contact with the outer supporting structure of the vessel. Over a period of time, portions of the refractory lining may become worn or damaged, reducing the thickness of the protective lining. Once such wear has been detected, it must be repaired with refractory material sprayed onto the lining by a conventional gunning device to prevent lining breakthrough.

Several methods have been suggested for inspecting and measuring worn or damaged areas in the interior lining of the BOF vessel. The simplest involves a visual inspection by the workman inside the vessel itself. However, this necessitates a considerable amount of time since the vessel must be allowed to cool before the inspection can take place. In addition, a considerable amount of energy must be expended to again raise the temperature of the vessel to the appropriate steel processing temperature. During this time, the vessel is out of service thereby slowing production and increasing the cost of the finished steel product.

In addition to the manual inspection method just described, various types of automated methods have also been explored. For example, in U.S. Pat. No. 4,107,244 issued Aug. 15, 1978 to Ochiai et al, wear of the vessel lining is measured by detecting the phase difference of modulated microwaves reflected from a reference surface of the refractory lining and the damaged surface. This information may then be used to control the refractory gunning nozzle to affect the lining repair.

In U.S. Pat. No. 4,218,989, issued Aug. 26, 1980 to Fujita et al, the inspection device is a conventional TV camera which provides an operator with a visual display of the lining condition. The operator may then manually take the appropriate steps to direct the gunning nozzle to affect the lining repair.

In U.S. Pat. No. 4,227,802, issued Oct. 14, 1980 to Scholdstrom et al, a modulated laser is used to sense the distance from a point outside the vessel to the inner wall of the vessel. Variations in this distance correspond to variations in the lining thickness. Phase information resulting from the reflected laser beam may then be correlated by means of a computer with the actual lining thickness.

In U.S. Pat. No. 4,248,809 issued Feb. 3, 1981, coaxial lines or wires are embedded in the furnace wall and are supplied with an electrical signal. Variation of the length of these lines as measured by the variation in the applied electrical signal may be correlated with the remaining thickness of the refractory material.

U.S. Pat. No. 4,301,998 issued Nov. 24. 1981 to Rodway describes apparatus for remotely controlling the gunning nozzle by means of a television camera mounted adjacent the nozzle.

Unexamined German patent specification OS 2945251 A1 filed Nov. 9, 1979 discloses apparatus for determining the level of a molten surface in a vessel, such as a continuous casting machine. A laser is directed at the surface with reflected radiation being received by a photoelectric receiver. The output is sent to a scanning and evaluation circuit. Both the transmitter and receiver are fixed in place with no scanning.

The present invention is directed to apparatus for measuring the relative thickness of the refractory lining to provide a visual display of those areas of the lining wall which are worn and may require repair. The entire measuring assembly may be lowered into the upright hot vessel and used to measure the condition of the refractory lining within the harsh (i.e. hot) environment of the furnace vessel following each heat without the need to allow the vessel to cool, and without the necessity of changing the normal vertical orientation of the vessel. Furthermore, it is not necessary to cool the hot furnace lining in any way, as for example, by spraying water on the lining.

In a preferred embodiment, the apparatus is usable with the type of furnace vessel which is generally vertical and has an opening at the top of the vessel although the invention is also usable with non-vertically oriented vessels. The measuring apparatus comprises inspection means including a narrow band continuous wave laser transmitter for directing a collimated substantially monochromatic light beam toward the furnace wall. The reflected light beam is received by a self-scanned linear array receiver. This array comprises a plurality of optical elements positioned in side-by-side relationship along a linear axis, each of the elements producing an electrical signal in response to the reflected light beam. The linear array is arranged in a specific geometric relationship with the laser transmitter such that the reflected light beam will fall on a particular element. In the event that a variation in the lining thickness occurs, either a depression or a built-up area, the reflected beam will fall upon a different element. From the difference between the nominal receiving element and the actual receiving element, in the event that a variation in the lining thickness occurs, either a depression or a built-up area, the reflected beam will fall upon a different element. From the difference between the nominal receiving element and the actual receiving element, the relative thickness of the lining wall may be determined.

A narrow bandpass optical interference filter passing substantially only the wavelength of the reflected light beam is positioned in front of the linear array. This filter eliminates other background radiation such as that associated with the adjacent hot lining surface. A lens is also positioned between the filter and the linear array to focus the reflected light beam on the array.

The measuring apparatus is further provided with means for lowering the inspection means through the top opening into the furnace vessel, in the case of vertically oriented vessels. The entire structure may be supported from a beam extending across the top of the furnace. Means are provided for rotating the inspection means in a substantially horizontal plane about a vertical axis. This permits the entire inner circumference of the lining to be scanned and inspected at a particular vertical position within the vessel. Means are also provided for indexing the inspection means to a plurality of vertical positions within the vessel. This permits the entire vessel lining to be inspected.

In order to permit the inspection apparatus to operate in the hostile environment existing within the hot furnace vessel, the entire inspection apparatus may be housed within an insulated enclosure having a water cooled jacket. The flow rate and temperature of the cooling water provided to the jacket are such that the interior temperature of the enclosure is maintained well within safe operating limits for the electronic components and other components comprising the inspection apparatus.

In addition, special precautions are taken to control the operating temperature of the narrow bandpass optical interference filter. As will be explained in more detail hereinafter, the temperature coefficient of a typical optical interference filter is about 0.14Å/° C. In the situation where the interior temperature of the inspection apparatus may vary, it is necessary to control the temperature of the very narrow bandpass filter to maintain peek transmittance of the helium-neon laser wavelength. It has been found that a 5Å bandpass (full-width at half maximum) filter can be maintained at 38° C.±2° C. to provide this peak transmittance at the He Ne laser wavelength of 6328Å. The filter is centered on the 6328Å line at a temperature of 38° C. since this temperature is more easily maintained inside the box when suspended inside a hot vessel. The temperature is maintained at approximately 38±2° C. by temperature control means including a thermocouple sensor, an electric heater and an air operated vortex refrigeration tube.

The electronic processing associated with the inspection apparatus also includes means for minimizing the effect of background radiation. A background following threshold signal is produced against which the video signal spike produced by the laser beam scattered from the furnace vessel wall can be compared. This increases the dynamic range of the inspection apparatus since the effects of radiation produced by the hot furnace wall, but lying within the optical bandpass of the system, are eliminated.

Effects of background are also eliminated by means of an automatic light level circuit which automatically sets the scan rate of the self-scanned linear array receiver so that maximum usage of the receiver's dynamic range is obtained. As will be described in more detail hereinafter, if the furnace wall temperature, or furnace wall reflectivity change, the scan rate of the linear array is suitably modified to maintain a good signal to noise ratio of the scattered laser signal to the background radiation emitted by the hot furnace walls.

Processing means are also provided for correlating a particular electric signal received from a particular linear array element with the lining thickness at a particular point on the furnace wall. This information may be displayed on a visual display or hard copied on a printer so that an operator can determine exactly where on the vessel lining repair is necessary. The gunning nozzle may then be directed to this point to repair the worn area with refractory material. In the preferred embodiment described, the gunning nozzle is mounted below the inspection assembly means so that it may be operated through the same rotating and vertically indexing mechanism as the inspection means. A conventional television camera and monitor are also provided for visually inspecting the worn/repaired area.

Further features of the invention will become apparent from the detailed description which follows.

BRIEF DESCRIPTION OF THE DRAWING

FIG. 1 is a top plan view schematically illustrating the measuring apparatus of the present invention positioned within the furnace vessel.

FIG. 2 is a fragmentary side elevation schematic view illustrating the measuring apparatus of the present invention positioned within the furnace vessel.

FIG. 3 is a fragmentary side elevation view of the measuring apparatus of the present invention within the furnace vessel and associated supporting structure.

FIG. 4 is a fragmentary front elevation view of the measuring apparatus and supporting structure of FIG. 3 with the inspection means retracted from within the furnace vessel.

FIG. 5 is a block diagram of the signal processing of the present invention.

DETAILED DESCRIPTION

Figure 1A:
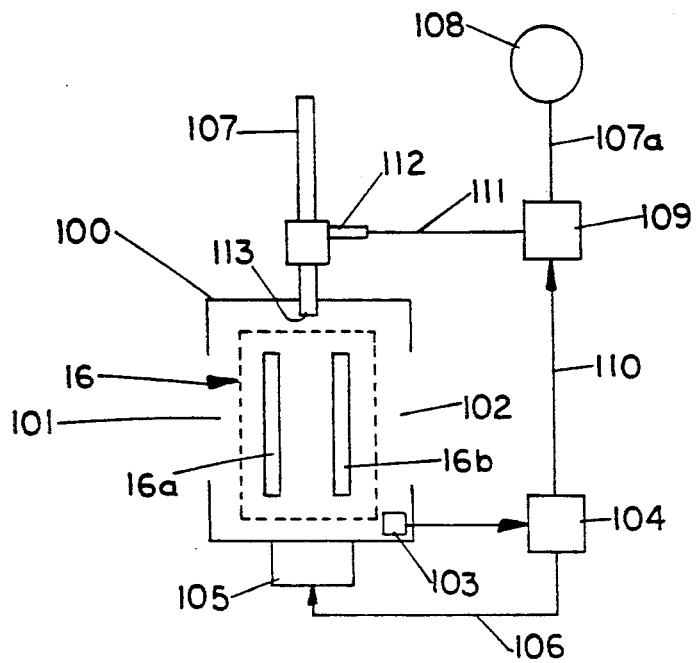
FIG. 1A is a top plan view schematically illustrating the narrow band optical filter means.

The primary components of the measuring system of the present invention are illustrated schematically in FIG. 1. The measuring apparatus, shown generally at 1, includes inspection means 2 which is mounted on a generally flat horizontally oriented rectangular-shaped mounting plate 3. As can best be seen in FIG. 1 and FIG. 2, mounting plate 3 may be positioned within the furnace vessel 4 in spaced relationship with the inner surface 5 of the furnace vessel lining 6. As is well known in the art, lining 6 is constructed from a heat resistant refractory material. This lining generally consists of a thick layer, approximately 1m thick, of ceramic brick inside a steel shell. This refractory material protects the steel walls of the thermos-shaped vessel from the 1600° C. molten steel during the violent exothermic process which occurs during the steel refining. As is well known, the refractory brick lining eventually wears away due to the constant bombardment from the scrap charging and the corrosive nature of the molten steel/slag combination.

Inspection means 2 includes a narrow band continuous wave laser transmitter 7 which directs a collimated substantially monochromatic light beam illustrated schematically at 8 toward the inner wall surface 5 of the furnace vessel. Where the lining 6 is essentially undamaged, the incident light beam 8 will strike the inner surface at a point 9 and be reflected along nominal reflectance path 10. However, in the event that the lining contains a worn or damaged area 11, the incident light beam 8 will strike the damaged area at a point 12 and be reflected along a different path 13. It will be understood that laser transmitter 7 may be of any conventional type such as HeNe, Argon, HeCd, etc. In addition, laser units producing light beams of different wavelengths may be used in different types of furnaces, depending upon the relative wall temperatures involved. In the preferred embodiment illustrated, a 9mW hard-seal helium-neon laser producing an output at 6328Å has been found to produce good results when used to illuminate the interior of furnace vessels having a wall temperature of about 1100°-1300° C. Since the He-Ne laser may represent a potential eye danger from the raw laser beam, a very small electrically operated shutter 7a is placed in front of the laser transmitter. As will be explained hereinafter, this shutter is activated by a switch on the hoist assembly which causes the shutter 7a to open when the inspection apparatus 1 has descended into the furnace vessel.

As can also be seen in FIG. 2, for example, laser transmitter 7 can be positioned slightly above the plane of mounting plate 3 by any convenient means, not shown.

Inspection means 2 also is provided with a self-scanned linear array receiver 14. Receiver 14 is positioned so as to detect the light beam reflected from the furnace wall. In the embodiment illustrated, self-scanned linear array 14 comprises a plurality of optical elements $14a-14i$, for example, lying along a linear axis 15. Each of the optical elements produces an electrical signal output in response to the reflected light beam falling on that element. It will be observed that the geometrical relationship of receiver 14 and transmitter 7 is important in the present invention. As is best shown in FIG. 1, linear axis 15 of the array is positioned substantially perpendicularly to the normal or nominal path of reflectance 10, so that the normal or nominal reflected light beam reflected from the undamaged wall 5 strikes array element 14e. In other words, the array elements lie along a substantially linear axis which is in the same plane as the laser transmitter axis. This last mentioned plane is substantially horizontal in the embodiment of FIG. 1 and substantially vertical in the embodiment of FIG. 2. In situations where the furnace wall is further away from receiver 14, as where the lining is damaged or worn, the reflected light beam, exemplified by path 13, will be such as to strike one of the other optical array elements, such as element 14d. It will be further understood that in the event there is a built-up area on the furnace lining, the reflected light beam will also be displaced to a different array element, albeit in the opposite direction. In all events, it will be observed that the angle $\phi$ between incident path 8 and normal reflectance path 10 remains constant.

For purposes of an exemplary showing, receiver 14 may comprise a Reticon 256 element self-scaned linear array sensor as will be described in more detail hereinafter.

Optical filter means 16 is schematically illustrated in FIG. 1A, and also includes means for controlling the temperature of the filter means. In the preferred embodiment illustrated, the optical filter means 16 is designed to be optically responsive only to the wavelength associated with the laser beam produced by laser transmitter 7, and not to background radiation produced by the hot furnace vessel wall. As noted hereinabove, laser transmitter 7 produces an output having a wavelength of 6328Å. Optical filter means 16 thus comprises a first optical bandpass filter 16a having a relatively wide bandpass of about 6328Å±15Å at a filter temperature of 38° C., followed by a second closely spaced optical bandpass filter 16b having a narrower bandpass of about 6328Å+2.5Å at a filter temperature of 38° C. Together, filters 16a and 16b create an optical bandpass of about 6328Å±2.5Å.

Optical filter means 16 is contained within a generally closed housing 100. Housing 100 is provided with a front opening 101 through which the reflected laser beam 13 can enter the housing, and an exit opening 102 through which the filtered reflected laser beam can pass to impinge on one or more of the elements $14a-14i$ of receiver 14. In other words, housing 100 will be oriented on mounting plate 2 so that entrance opening 101 faces the furnace wall, while exit opening 102 faces the receiver 14.

The optical filter means also includes means for maintaining the temperature of filter 16a and 16b at approximately 38° C.±2° C. As noted hereinabove, the temperature coefficient of a typical interference filter such as that described herein is 0.14Å/° C. Consequently, in order to ensure that the passband of the optical filter means 16 remains centered on the wavelength of the laser beam produced by laser transmitter 7, the temperature of the environment within enclosure 100, and hence the temperature of filters 16a and 16b, is closely maintained.

This is accomplished by a thermocouple sensor 103 which monitors the interior temperature of enclosure 100, and provides an electrical signal indicative of this temperature to electronic temperature control means 104. In the event that the interior temperature of the enclosure drops below about 38° C., an electrical heater 105 is switched on by means of an appropriate signal on line 106 from temperature control means 104. This serves to raise the interior temperature of the enclosure, and hence the temperature of optical filters 16a and 16b. In the event that the temperature within the enclosure exceeds about 39° C., the heater 105 is switched off, and a vortex tube refrigeration unit 107 is activated. As is well known, a vortex tube, such as that produced by Vortec Corporation of Cincinnati, Ohio, can be used to convert a supply of compressed air into a cold air stream. In the configuration illustrated in FIG. 1A, compressed air from a compressed air source 108 is supplied to an electrically operated air control valve 109. When valve 109 is activated by a suitable control signal on line 110 produced by electronic temperature means 104, compressed air will be supplied on line 111 to the input 112 of vortex tube 107. This causes a stream of very cold air, in some instances as low as −40F., to be produced at the cold outlet 113 of the vortex tube. The cold outlet 113 of the vortex tube is provided through an opening in the side of enclosure 100 so that the cold air may freely circulate about filters 16a and 16b, thereby providing cooling air to the filters. It will be understood that this cooling operation will take place under control of electronic temperature control means 104 whenever the temperature within enclosure 100 exceeds about 39° C. as sensed by temperature sensor 103. Consequently, the temperature within the enclosure is maintained within close limits.

It will be understood that other types of optical filter arrangements may also be utilized. For example, it has been found that a first interference filter 16a having a bandpass of 6328Å±15Å with no second filter 16b produces adequate results in furnace vessels having refractory bricks with good scattering characteristics up to approximately 1100° C. at linear array receiver scan rates as high as 100Hz. An alternate design utilizing no first filter 16a and a second filter 16b comprising an interference filter having a bandpass of 6328Å±8Å produced satisfactory results from good scattering refractory brick to approximately 1300° C. at linear array scan rates to 100Hz.

With the preferred embodiment described hereinabove utilizing both filters 16a and 16b, excellent results were obtained on scattering refractory brick at temperatures as high as 1330° C. at scan rates of 100Hz. Furthermore, for the particular photodiode array 14 described herein, an acceptance angle of ±3.4° was obtained.

Narrow bandpass optical filter means 16 is positioned in the path of the reflected light beam in front of linear array 14. Filter means 16 is designed to pass substantially only the wavelengths associated with the reflected light beam, and to reject other incident radiation, such as that which might be emitted from the hot inner surface 5 of the furnace vessel, which may be in the neighborhood of 980° C.-1650° C. Optical filter means 16 may be supported on mounting plate 3 by any convenient means, not shown. In addition, the front portion of linear array 14 may be shielded as indicated by a slotted housing 17 to restrict the amount of ambient radiation reaching the optical elements 14a–14i.

A lens 18 is also positioned in the path of the reflected light beam in front of linear array 14 for focusing the reflected light beam on the array elements. Lens 18 may be mounted on mounting plate 3 by any convenient means, not shown. It will be understood that the angle between the incident light beam from laser 7 and the axis of lens 18 is constant. For the preferred embodiment described, lens 18 may comprise a 50mm C-mount TV lens with a F2 aperture and a focus of 2m. It will be observed that the focus point of 2m for lens 18 corresponds to an interior furnace vessel diameter of about 4m, since the inspection apparatus is positioned so that the central or longitudinal axis of the furnace vessel passes through the lens. However, other types of lenses may be used with different types of furnace vessel configurations, or where the inspection means is off-set from the longitudinal furnace axis.

As can best be seen from the schematic illustration in FIG. 1, the presence of a worn or damaged area of depth X will cause the point of reflectance of the incident light beam to shift from point 9 located a distance $R_o$ from the central vertical axis of lens 18 to a point of reflectance 12 displaced an additional distance X from the central vertical axis of lens 18 and a distance Y displaced transversely of reflectance path 10. At the same time, a reflected beam impinging on the linear array 14 shifts from nominal center element 14e to another optical element such as element 14d. This produces a corresponding translation in the reflectance path measured by angle α. The focal length of lens 18 is designated as f. A parameter $M_o$ is identified as the particular optical element, such as element 14e, associated with reflectance path 10 (distance $R_o$). Likewise, a parameter $M_l$ is identified as the optical element, for example element 14d, associated with the reflectance path 13. The distance between these two optical elements, i.e. $M_l$-$M_o$ is identified as a parameter $\Delta y$. Finally, the distance between reflectance path 10 and the point at which the incident beam 8 emerges from laser 7, i.e. the distance from optical element 14e to the point where the plane of the array intersects the axis of the laser beam, is identified as L.

It can be shown by trigonometric manipulation that:

$$X = R_o \frac{L}{\Delta y} \frac{f}{R_o + f} \quad 1\text{-}1$$

Since L is fixed and the focal distance f is known, the only variable is $M_l$, the optical element 14 receiving reflected energy from the worn or damaged area.

Consequently, by merely counting the displacement of the reflected light beam on the linear array, the amount of wall wear (or build-up in the case of a translation of the reflected beam in the opposite direction) can be directly obtained.

It will be observed that laser transmitter 7 is positioned slightly above the plane of receiver 14. Furthermore, in the preferred embodiment illustrated, the axis of the laser transmitter must lie in the plane containing the long axis of the array, 15.

If desired, a conventional television camera 22 may also be associated with mounting plate 3 so as to view the area of the wall under consideration.

As best shown in FIG. 4, the front face of enclosure 19 is provided with three windows 23 arranged along a vertical axis. In the preferred embodiment illustrated, the incident light beam is directed through the upper window from laser transmitter 7. The lowermost window 23 is positioned in front of linear array 14 and receives the reflected light beam. The conventional television camera 22 views the area under consideration through the central window. It will be understood that these windows will be constructed of a heat resistant material, and in the case of the windows associated with the laser transmitter and linear array, may be formed from a material transmissive only to the laser wavelength to provide optical filtering.

It is also desirable to be able to scan the inspection apparatus over the interior surface of the furnace vessel 4 so that the entire lining may be inspected. This may be accomplished as shown schematically in FIG. 3 and FIG. 4. Fundamentally, inspection means 2 is mounted within a box-like enclosure 19 which completely surrounds the inspection means to protect the various components from the hostile environment within the furnace vessel structure. The enclosure may be cooled by means of a cooling fluid, such as water, circulated through the walls of the enclosure by means of flexible supply and exhaust conduits 20 and 21, respectively. Fluid may be supplied to conduits 20 and 21 from a source of fluid supply, not shown. For example, enclosure 19 may comprise a double-walled container made of stainless steel with approximate dimensions 1m × 1m × 0.5m, with internal baffling (not shown) to aid in directing the water flow for uniform cooling. The water space between the walls of the enclosure 19 may be supplied with water through supply line 20 at a flow rate of about 750 liters per minute at approximately 2.72Kg/CM². At a water temperature of 29° C., this flow rate will just balance the heating rate for a furnace wall vessel temperature of 1200° C. to produce a desired temperature within the enclosure 19 of about 38° C. The temperature within the enclosure, as well as the exit cooling water temperature may be monitored by temperature sensitive thermocouples, not shown. In addition, compressed air for supplying vortex cooler 107 may be supplied through supply conduit 107a as best shown in FIG. 4.

Inspection means 2 and its enclosure 19 are supported within the furnace vessel by means of the structure illustrated in FIG. 3 and FIG. 4. In FIG. 3, the inspection means is illustrated in a lowered position, while in FIG. 4 the inspection means is illustrated in a fully retracted position, where the inspection means could be positioned above the top opening of the furnace vessel.

A horizontally disposed supporting beam 24 extends across the top of the furnace opening, and is spaced some distance thereabove. Beam 24 supports a plurality of transversely extending horizontally disposed spaced I-shaped beams or tracks 25 having a downwardly depending web portion terminating at its lower end in outwardly directed flanges. Tracks 25 support a crane structure, shown generally at 26, which is supported on the track flanges by rotatably mounted wheels, one of which is shown at 27, so that the entire crane structure may be moved horizontally back and forth by means of electric drive motors 28. A position controller 27a, such as a limit switch, for example, shown schematically in FIG. 4, may be used to stop the horizontal movement of the inspection means at the axis of the vessel.

The lower portion of crane structure 26 is defined by a pair of spaced parallel vertically depending side rails 29 joined at their lower ends by a transversely extending end frame member 30.

The vertically movable carriage shown generally at 31 is free to move along Side rails 29 upon rotatably mounted wheels 32. The entire carriage may be raised or lowered by means of an electrically operated winch 33 connected to the upper end of carriage 31 by a cable 34. The vertical position of the carriage and hence the inspection means may be sensed by a position transducer 31a. In addition, an electrical switch 31b may be associated with transducer 31a for determining when the inspection means 1 has been lowered within the furnace vessel. As described hereinabove, an electrical signal provided by switch 31b may then be utilized to activate shutter 7a to prevent potential eye danger from laser transmitter 7. Consequently, switch 31b in conjunction with shutter 7a insure that the laser beam will be produced beyond the confines of enclosure 19 only when the inspection means is within the furnace vessel.

Carriage 31 mounts a hopper 35 which contains a supply of the refractory lining material for repairing the furnace wall lining. The lower end of the hopper terminates in a conduit 36, the lower end of which is formed in a horizontally directed spray nozzle 37 positioned beneath inspection means enclosure 19. Consequently, the fluid refractory material may be conveyed under pressure from hopper 35 through conduit 36 to spray nozzle 37 to repair the worn or damaged area as is well known in the art.

Means are also provided for rotating the inspection means 2 in a substantially horizontal plane about a vertical axis, which in the preferred embodiment is the central axis of the vessel. This is provided by a rotary table shown generally at 38 located at the lower end of carriage 31. It will be understood, however, that the inspection means may be located off-center of the central axis of the vessel, and suitable provision made in the optics and electronic processing to account for the horizontal displacement. Rotary table 38, as well as water supply conduit 20, water exhaust conduit 21, air supply conduit 107a and refractory material supply conduit 36, which are connected to it, may be rotated approximately 360° by means of a motorized drive assembly 39. Drive assembly 39 may be provided with a rotary encoder, shown schematically at 40 in FIG. 4, for example, so that the actual angular position of the inspection means 2 and spray nozzle 37 may be accurately determined.

To summarize, inspection means 2 and spray nozzle 37 may be translated in a horizontal direction by the crane structure 27, and in the vertical direction by the vertical movement of carriage 31. Likewise, rotational movement may be imparted to inspection means 2 in order to scan the entire interior of the furnace vessel by means of rotary table 38 and its associated electromechanical driving structure 39.

In operation, the inspection means is positioned over the top opening of the furnace vessel by moving crane structure 27, with the horizontal position being sensed by horizontal encoder 27a. Inspection means 2 may then be lowered into the vessel to a particular height immediately below the vessel opening by means of carriage 31, with the vertical position being measured by vertical encoder 31a. When the inspection means has reached a predetermined vertical position within the furnace vessel, switch 31b will be activated, causing shutter 7a to open. The inspection means may then be rotated by means of rotary table 38 with the radial position being measured by rotary encoder 40. For example, a measurement may be taken at a plurality of positions around the inner circumference of the furnace wall.

At each measurement point, the laser radiation reflected from the wall lining will impinge on a particular optical element 14a-14i, in order to provide an indication of the thickness of the lining as noted hereinabove. As shown in the block diagram of FIG. 5, the information resulting from the linear scanned array 14, as well as the position information from the position encoders, is directed to a signal processor 41, such as a digital computer. An array controller, 44, transforms the displacement of the focused laser spot on the array into an analog voltage proportional to wall wear or build-up. The resulting data may then be displayed on a visual display 42 or given as hard copy from a printer 43 in order to provide a display of the actual profile of the wall surface at a particular height. After each radial scan has been completed, the inspection means may be lowered a predetermined amount, and the scanning process repeated.

The electronic processing associated with the inspection apparatus of the present invention also includes means for minimizing the effect of background radiation. In general, a background following threshold signal is produced against which the video signal spike produced by the laser beam scattered from the furnace vessel wall can be compared. At the same time, the effects of background caused by the elevated temperature of the furnace vessel walls are eliminated by an automatic light level circuit which automatically sets the scan rate of the self-scanned linear array receiver so that maximum usage of the receiver's dynamic range is obtained. These circuits are illustrated schematically in FIG. 6, where elements similar to those previously described have been similarly designated. It will be understood that this circuit may be implemented as part of array controller 44.

As is well known with the type of self-scanned linear array utilized in the present invention, the video output signal produced by each of the individual elements comprising array 14 is clocked out in serial fashion on RAW VIDEO output line 200. It will be understood that the RAW VIDEO signals produced on output line 200 are clocked serially at a relatively high clock rate, e.g. 100 KHz via a clock signal internal to the receiver.

The scan rate (as opposed to the clock rate) of linearly scanned array 14 is controlled by an input START signal on input line 201. This signal initiates each scan of the 256 elements comprising linearly scanned array 14. In other words, following each START signal, each of the 256 elements comprising the array will be interrogated and read out in serial fashion at the clock rate of about 100 KHz on output line 200. The repetition or scan rate of the START signal is determined by voltage controlled oscillator 202 as will be described in more detail hereinafter.

The RAW VIDEO signal on line 200 is applied to a low pass filter 203 and to the inverting input of voltage comparator 204.

The bandpass of low pass filter 203 is such that the high frequency spikes associated with irregularities or defects in the furnace vessel wall and the laser signal are eliminated. Consequently, the signal appearing on line 205 from the output of low pass filter 203 is indicative of the background radiation associated with the area being scanning by the inspection apparatus during each scan of linearly scanned array 14. In other words, low pass filter 203 operates to remove or extract the low frequency background information from the RAW VIDEO signal on line 200.

The background signal on line 205 is applied to the non-inverting input of voltage comparator 204 and to the control input of voltage controlled oscillator 202. Consequently, the repetition rate of the START signal produced by voltage controlled oscillator 202 is dependent on the magnitude of the background signal on line 205. Consequently, when the background signal increases, indicative of an increase in background radiation or temperature, the repetition rate of the START signals will increase. Conversely, if the background radiation decreases, the repetition rate of the START signals will decrease.

Figure 7:
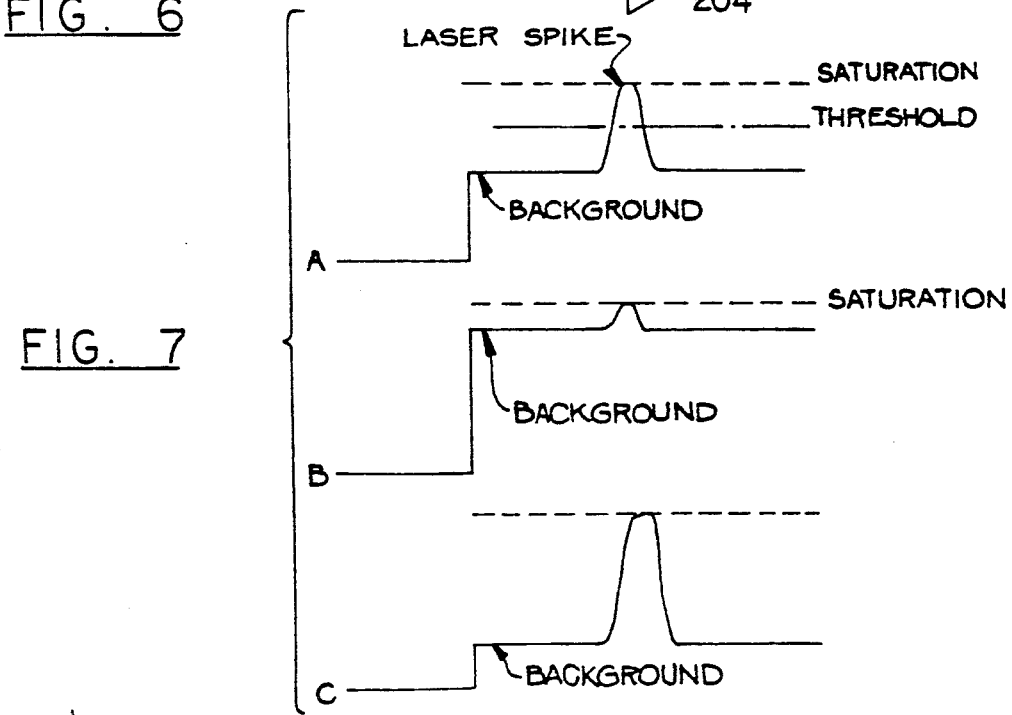
FIG. 7 is a graphical representation illustrating the RAW VIDEO signal output.

The effect this operation has on the RAW VIDEO output is illustrated in FIG. 7. A typical RAW VIDEO output for a portion of a single linear array scan under conditions of moderate background is illustrated in trace A. When the first element, for example element 14a of the linearly scanned array, is interrogated by the clock, an output will occur on the RAW VIDEO line 200 corresponding to the background level. Since each array element integrates the light passed by the optical filter means 16 and lens 18 impinging on the element over a period of time, the magnitude of the RAW VIDEO signal attributable to the background will be a function not only of light intensity but also of time duration, specifically the total integration time corresponding to the interval between successive array scans.

When the reflected laser beam impinges on one of the array elements, an increased RAW VIDEO signal output will occur from that element. Generally, the increased laser "spike" caused by the impinging laser beam would also be a function of scan rate. However, in the embodiment of the present invention, the linearly scanned array 14 is operated so that the output caused by the laser spike is always in saturation, regardless of the background level. Consequently, the laser spike amplitude itself will be substantially constant.

Trace B of FIG. 7 illustrates the condition where the background radiation increases, so that the average output from the RAW VIDEO signal also increases in proportion. Since the laser spike amplitude is constant, it will be observed that the increase in background radiation substantially reduces the dynamic range of the array receiver output. As described hereinabove, the increased background radiation also causes an increase in the scan rate for the array, so that the total integration time associated with background radiation falling on each element is reduced. This causes a corresponding decrease in the average output from each element attributable to the background radiation, so as to return the RAW VIDEO output to the condition illustrated in trace A. That is, the average background level is reduced, thereby increasing the contrast or difference between the background level and the laser spike amplitude.

Another condition is illustrated in trace C in FIG. 7, where the average background radiation level decreases. Under this condition, the array scan rate will be decreased, increasing the total integration time and therefore also increasing the average output from each array element attributable to the background radiation. Again, the automatic compensation circuit previously described thus operates to return the RAW VIDEO output to the condition illustrated in trace A.

Figure 6:
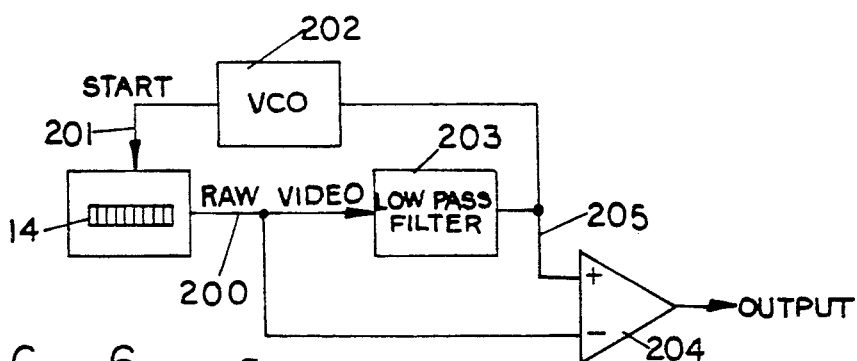
FIG. 6 is a schematic block diagram of the background following threshold and automatic light level circuit.

The circuit illustrated in FIG. 6 also includes means for providing a background following threshold by comparing the RAW VIDEO signal against the output from low pass filter 203 which bears a direct relationship to the magnitude of the background radiation as integrated by the elements comprising array receiver 14. This is carried out by means of voltage comparator 204 which has one input connected to the background signal appearing on line 205, and the other input connected to the RAW VIDEO signal. This operation is illustrated diagrammatically in trace A of FIG. 7.

The threshold signal on line 205 is nominally set to be approximately 16% of the laser spike amplitude. Consequently, whenever the RAW VIDEO signal exceeds the threshold level, an output will be produced from voltage comparator 204 indicating that the receiver has detected the reflected laser beam. Such outputs can then be related to the radial distance of the vessel lining and stored or otherwise displayed as described hereinabove.

It will be understood that the light level control and background following threshold circuit illustrated in FIG. 6 serves to reduce the effect of background radiation from the hot furnace vessel wall on the sensitivity of the inspection means of the present invention. Consequently, the present invention can be utilized to inspect the lining of vessels between heats, without the need to allow the vessel to cool substantially.

At each inspection point, the gunning nozzle may also be operated to repair the worn or damaged area. Verification that the repair has been affected may be made through the conventional TV camera 22 and a television monitor which may be display 42. Alternately, the information relating to the relative aligning thickness may be stored in processor 41 and displayed at a later time in order to enable the operator to direct the gunnite nozzle to spray refractory material at the appropriate location on the lining surface.

It will be understood that the above measurement sequence may be performed after every heat or after a predetermined number of heats. In addition, one of the measurement structures may be provided for each BOF, or for a plurality of BOF vessels. The two axis scanning permits the profile of the lining to be ascertained with a high degree of accuracy and reliability.

It will be understood that various changes in the details, materials, steps and arrangements of parts, which have been herein described and illustrated in order to explain the nature of the invention, may be made by those skilled in the art within the principle and scope of the invention as expressed in the appended claims.

The embodiments of the invention in which an exclusive property or priviledge is claimed are as follows:

1. Apparatus for measuring the relative thickness of the hot interior wall of a furnace vessel and the like comprising:
   a. inspection means including means for positioning the inspection means within the hot furnace vessel interior comprising:
      (i) a laser transmitter for directing a collimated substantially monochromatic laser light beam toward the interior furnace wall;
      (ii) a self-scanned linear array receiver positioned to detect the laser light beam scattered from the furnace wall, said array comprising a plurality of optical elements positioned in side-by-side relationship, each of said elements producing an electrical signal in response to the scattered laser beam, including means responsive to a scanning signal for sequentially scanning said elements at a predetermined rate to produce a video output signal;
      (iii) a bandpass optical filter positioned in the path of the laser beam scattered from the furnace wall for passing to the linear array receiver only those wavelengths associated with the scattered laser beam and rejecting those wavelengths associated with background radiation emitted by the hot furnace wall;
      (iv) means for maintaining a substantially constant temperature of said filter to stabilize the wavelength shift of said bandpass with changes in temperature including
         (a) means for sensing the filter temperature, and
         (b) means responsive to said sensing means for heating said filter if the filter temperature falls below a predetermined value, and means responsive to said sensing means for cooling said filter if the temperature of the filter exceeds a predetermined value;
   b. and, processing means including:
      (i) means for automatically compensating for changes in background radiation comprising means for sensing the level of background radiation detected by said array and means responsive to said sensed level for adjusting the scanning rate of said elements so as to reduce the effect of background radiation in said video signal and for comparing said video signal to a threshold signal representative of the level of background radiation;
      (ii) means for correlating said video signal with the relative wall thickness at a particular point on the furnace wall; and
      (iii) means for displaying the measured relative wall thickness.

2. The apparatus according to claim 1 wherein said automatic compensating means comprises low pass filter means responsive to said video signal for extracting a signal corresponding to the background radiation emitted by the hot furnace wall, means responsive to said background radiation level signal for adjusting the scanning rate of said scanning signal so as to reduce the effect of background radiation in said video signal, and voltage comparator means for comparing said video signal to said background radiation level signal to produce a signal representative of the relative wall thickness at a particular point on the furnace wall.

3. The apparatus according to claim 1 wherein said means for positioning said inspection means within the furnace vessel includes means for indexing said inspection means to a plurality of longitudinal positions within the vessel and means for rotating said inspection means about an axis extending in the longitudinal direction of the vessel.

4. The apparatus according to claim 3 wherein the furnace vessel is of generally vertical orientation and has a top opening through which the inspection means may be lowered into the vessel interior, said indexing means comprising means for indexing the inspection means to a plurality of vertical positions within the vessel, and wherein said rotating means comprises means for rotating the inspection means in a substantially horizontal plane about a vertical axis.

5. The apparatus according to claim 4 wherein said vertical axis lies on the central axis of the furnace, vessel.

6. The apparatus according to claim 4 wherein said inspection means is configured to operate within a furnace vessel having a wall temperature of at least about 1000° C.

7. The apparatus according to claim 6 including a gunning spray nozzle associated with said inspection means for directing fluid refractory material at the lining area inspected by the inspection means to affect the repair of a detected worn or damaged area.

8. Apparatus for measuring the relative thickness of the hot interior wall of a furnace vessel and the like comprising:
   a. inspection means including means for positioning the inspection means within the hot furnace vessel interior comprising:
      (i) a laser transmitter for directing a collimated substantially monochromatic unmodulated incident laser light beam toward the interior furnace wall;
      (ii) a self-scanned linear array receiver positioned to detect the laser light beam scattered from the furnace wall, said array comprising a plurality of optical elements positioned in side-by-side relationship, each of said elements producing an electrical signal in response to the scattered laser beam, including means responsive to a scanning signal for sequentially scanning said elements at a predetermined rate to produce a video output signal;
      (iii) a bandpass optical filter positioned in the path of the laser beam scattered from the hot furnace wall for passing to the linear array receiver only those wavelengths associated with the scattered leaser beam and rejecting those wavelengths associated with background radiation emitted by the hot furnace wall; and
      (iv) means for maintaining a substantially constant temperature of said filter to stabilize the wavelength shift of said bandpass with changes in temperature including
         (a) means for sensing the filter temperature, and
         (b) means responsive to said sensing means for heating said filter if the filter temperature falls below a predetermined value, and means responsive to said sensing means for cooling said filter if the temperature of the filter exceeds a predetermined value;
   b. and, processing means including:
      (i) means for automatically compensating for changes in background radiation comprising means for sensing the level of background radiation detected by said array and means responsive to said sensed level for adjusting the scanning rate of said elements so as to reduce the effect of background radiation in said video signal and for comparing said video signal to a threshold signal representative of the level of background radiation;

(ii) means for measuring the angular distance between the incident laser beam and the scattered laser beam producing said electrical signal from a particular array element;

(iii) means for correlating said measured angular distance with the relative wall thickness at a particular point on the furnace wall; and (iv) means for displaying the measured relative wall thickness.

* * * * *